United States Patent
Heller et al.

(10) Patent No.: US 7,361,283 B2
(45) Date of Patent: Apr. 22, 2008

(54) EXTRACTION AND TREATMENT OF HEAVY METALS

(75) Inventors: Bodo Heller, Templestowe (AU); Christopher Michael Starks, Narre Warren (AU)

(73) Assignee: Australian Organic Resources Pty. Ltd., Victoria (AU)

( * ) Notice: Subject to any disclaimer, the term of this patent is extended or adjusted under 35 U.S.C. 154(b) by 356 days.

(21) Appl. No.: 10/542,304

(22) PCT Filed: Jan. 19, 2004

(86) PCT No.: PCT/AU2004/000059

§ 371 (c)(1),
(2), (4) Date: Jul. 15, 2005

(87) PCT Pub. No.: WO2004/065028

PCT Pub. Date: Aug. 5, 2004

(65) Prior Publication Data

US 2006/0113254 A1 Jun. 1, 2006

(30) Foreign Application Priority Data

Jan. 21, 2003 (AU) .............................. 2003900241

(51) Int. Cl.
*C02F 11/14* (2006.01)
*C02F 101/20* (2006.01)

(52) U.S. Cl. ............... 210/710; 71/12; 134/10; 134/25.1; 210/712; 210/718; 210/721; 210/724; 210/726; 210/912; 210/916; 405/128.75

(58) Field of Classification Search .................. 210/712
See application file for complete search history.

(56) References Cited

U.S. PATENT DOCUMENTS 3,772,188 A * 11/1973 Edwards ...................... 210/629
3,945,918 A * 3/1976 Kirk ........................... 210/703

(Continued)

FOREIGN PATENT DOCUMENTS

GB 2113199 * 1/1983

(Continued)

OTHER PUBLICATIONS

Derwent Abstract Accession No. 96-275556/28, RU 2039726 C (AS Russia Sibe Sect Phys Tech Inst) Jul. 20, 1995.

*Primary Examiner*—Peter A. Hruskoci
(74) *Attorney, Agent, or Firm*—Connolly Bove Lodge & Hutz LLP

(57) ABSTRACT

Contaminated waste streams or soil or sludge is subjected to a first treatment stage with an acid liquor at a pH below 2 and at a solids content from 5 to 30%; then the liquid and solid phases from the first treatment stage are separated; the solids from the first treatment stage are mixed with a fresh acid liquor at a pH below 2 and a solids content from 5 to 30%; the liquid and solid phases from the second treatment stage are separated; the liquor separated from the first treatment stage is reacted with a base to precipitate the metals; the precipitated metals are separated and the liquor is recycled for reuse in the process; the solids separated from the second treatment stage are neutralized to adjust the pH to a level acceptable for a soil conditioner or fertilizer or other customized products; and the liquor from the second stage is used as the acidic liquor in the first treatment stage.

8 Claims, 1 Drawing Sheet

U.S. PATENT DOCUMENTS

| | | | |
|---|---|---|---|
| 4,377,486 A * | 3/1983 | Barrick et al. | 210/712 |
| 5,051,191 A * | 9/1991 | Rasmussen et al. | 210/721 |
| 5,248,419 A * | 9/1993 | Long et al. | 210/218 |
| 5,503,656 A * | 4/1996 | Hobby | 75/712 |
| 5,527,465 A * | 6/1996 | Dickerson | 210/620 |
| 5,888,404 A * | 3/1999 | Jokinen | 210/711 |
| 5,967,965 A * | 10/1999 | Vyshkina et al. | 588/256 |
| 6,010,630 A * | 1/2000 | Oinas et al. | 210/638 |
| 6,027,543 A * | 2/2000 | Yoshizaki et al. | 71/11 |
| 6,217,768 B1 * | 4/2001 | Hansen et al. | 210/622 |
| 6,855,256 B2 * | 2/2005 | Blais et al. | 210/620 |
| 7,166,227 B2 * | 1/2007 | Karlsson et al. | 210/712 |

FOREIGN PATENT DOCUMENTS

| | | |
|---|---|---|
| JP | 2002-101777 A | 4/2002 |
| WO | WO 1992/019551 A | 11/1992 |

* cited by examiner

EXTRACTION AND TREATMENT OF HEAVY METALS

This invention relates to the removal of heavy metals from sewage sludge and contaminated soils to produce a soil enhancer and fertilizer.

BACKGROUND OF THE INVENTION

Sewage sludge is usually discarded at the bottom of settling ponds. Old sludges are of little value in terms of the useful organic content, as they have been biodegraded and may contain high levels of heavy metals. They are usually the anaerobically digested or aerated end products of waste water treatment. These sludges often have a useful nutrient content of phosphate and nitrates. New sludges still have a high organic content and generate sulfur gases in particular hydrogen sulfide.

U.S. Pat. Nos. 3,942,970 and 5,387,257 propose the use of sewage sludges in fertilizer.

However most governments set maximum acceptable levels for metal content in fertilizers and soil enhancers particularly for arsenic, cadmium, chromium, copper, mercury, molybdenum, nickel, lead, selenium and zinc because of the potential that these metals will enter the food chain.

U.S. Pat. No. 5,009,793 discloses the removal of heavy metals from sludges and contaminated soils.

U.S. Pat. No. 5,178,776 discloses the removal of metals from sludges by acidification followed by a heating step to sterilize the treated solids.

U.S. Pat. No. 5,051,191 treats non oxidized sewage sludge at a low solids content to remove heavy metals by acid solubilization and subsequent precipitation from the liquid phase to leave a decontaminated sludge that is neutralized and then used as a soil conditioner and fertilizer.

USA application 2002/0153307 improves on this process by operating at a higher acid pH to reduce the solubilization of fertilizing elements in the sludge.

A problem with prior art processes is that a waste stream is still produced. Also because the value of the decontaminated sludge is not high the cost of carrying out the process must be kept to a minimum. Some prior art processes use expensive chemicals and require heating of the sludge all of which adds to processing costs.

It is an object of this invention to provide a process that overcomes the problems of the prior art.

BRIEF DESCRIPTION OF THE INVENTION

To this end the present invention provides a method of decontaminating heavy metal contaminated soil or sludge which includes a) treating soil or sludge with an acid liqour at a pH below 2 and at a solids content from 5 to 30% in a first treatment stage b) separating the liquid and solid phases from the first treatment stage c) mixing the solids from the first treatment stage with a fresh acid liquor at a pH below 2 and a solids content from 5 to 30% in a second treatment stage d) separating the liquid and solid phases from the second treatment stage e) treating the liquor separated in step b) from the first treatment stage to precipitate metals f) separating the precipitated metals from the liquor of step e) and recycling the liquor for use in the process g) treating the solids from step d) to adjust the pH to a level acceptable for a soil conditioner or fertilizer h) using the liquor from step d) as the acidic liquor in the first treatment stage for fresh batches of soil or sludge.

The method of this invention produces a solid heavy metal mix which may be further treated to produce metals for use in other processes. No liquid effluent is produced as all liquid is reused in the process. The liquor from step f) is usually mixed with fresh acid to ensure the pH is below 2. The low pH in the treatment stage has the additional benefit of destroying more than 99% of any pathogens present in the sludge, which is most likely with new sludges.

The acid used may be any acid suitable for dissolving the metals and may be selected from phosphoric, nitric, citric, acetic or sulfuric acid. Sulfuric acid produced as an industrial by product is preferred because it is inexpensive.

The acid solution concentration is generally from 0.2% to 10% preferably 1% and is usually used in a ratio of up to 10 parts by weight of acid solution to one part by weight of sludge on a dry weight basis, depending on the degree of heavy metal contamination. Preferably the range is between three and six parts of acid solution to one part by weight of sludge.

This double counterflow process ensures that the metal content of most sludges or contaminated soils is reduced to acceptable levels.

Newer sludges are generally lower in metal contamination levels and a single treatment stage may be sufficient. However, because newer sludges may include flocculants used in the sewage treatment plant, they may have to be treated at lower solids content than older sludges. If the contamination is particularly high as in older sludges an additional third treatment stage may be needed.

The residence time in the reaction vessel may be from 10 minutes to 12 hours and depends in part on the time to fill and empty the vessel. The mixture in the vessel is preferably agitated to ensure thorough mixing of the sludge and acid liquor. New sludges often have a higher organic content and offensive odours due to the presence of hydrogen sulfide. For treating newer sludges it is preferred to use a closed reaction vessel to contain the hydrogen sulfide and other gases generated during the dissolution step. The head space in the closed reaction vessel may contain an ozone generation system which converts the hydrogen sulfide to sulfurous and sulfuric acid which dissolve in the liquid phase. The ozone generation system may be any conventional ozone generation system but is preferably a bank of ultraviolet light lamps emitting wavelengths that convert oxygen into ozone. Alternativley ozone may be supplied into the head space from an external generator or supply. Where only old sludges are to be treated an open vessel is feasible.

Where both old and new sludges or contaminated soils are available it may be viable to blend the sludges and soil and treat the blend. This reduces the level of contamination compared to old sludges and reduces the amount of hydrogen sulfide compared to the newer sludges. Because in some locations both old and new sludges are available it is preferred to blend sludges and use an optimum plant layout of two closed vessels.

The two separation stages b) and d) may use any suitable solids liquid separation technique including a filter press or centrifuge.

The metals are precipitated by adding to the twice used liquor from the first treatment stage a base such as potassium hydroxide to bring the pH to a value of about 7. Potassium is preferred as the base because it is a plant nutrient. The precipitated metals are separated by any suitable physical separation means including filtration through a filter press or by way of a centrifuge. In order to facilitate extraction of the metals sequestering and complexing agents may be added to the solution at any stage of the process at a concentration of 0.5% to 10% by weight and preferably are added in the first treatment stage. These agents include acetodiphosphonic acid, aminotris (methylene phosphonic acid), (2hydroxyethyl)iminobis-(methylene phosphonic acid), ethylenediaminetetrakis-(methylene phosphonic acid), hexamethylenediaminetetrakis-(methylene phosphonic acid), diethylenetriaminepentakis-(methylene phosphonic acid), ethylene diamine tetracetic acid and its salts.

The precipitate usually contains an iron-aluminum-phosphate hydroxide in which the heavy metals are scavenged. By careful control of the pH it may be possible in some cases to separate the metals from the phosphate so that the phosphate can be returned to the decontaminated sludge. The extracted metals may be immobilized by encapsulation as construction fill such as dolocrete. In some cases extraction of particular heavy metals by smelting may be economically feasible. The solids recovered from step d) are generally too acidic and are neutralized by mixing with 5% to 75% by weight of pulverized limestone on a dry weight basis. This product is acceptable as a soil amendment material and may be blended with other materials such as phosphate or nitrogen fertilizer to produce a range of materials such as soil conditioner, compost, or fertilizer.

DETAILED DESCRIPTION OF THE INVENTION

Figure 1:
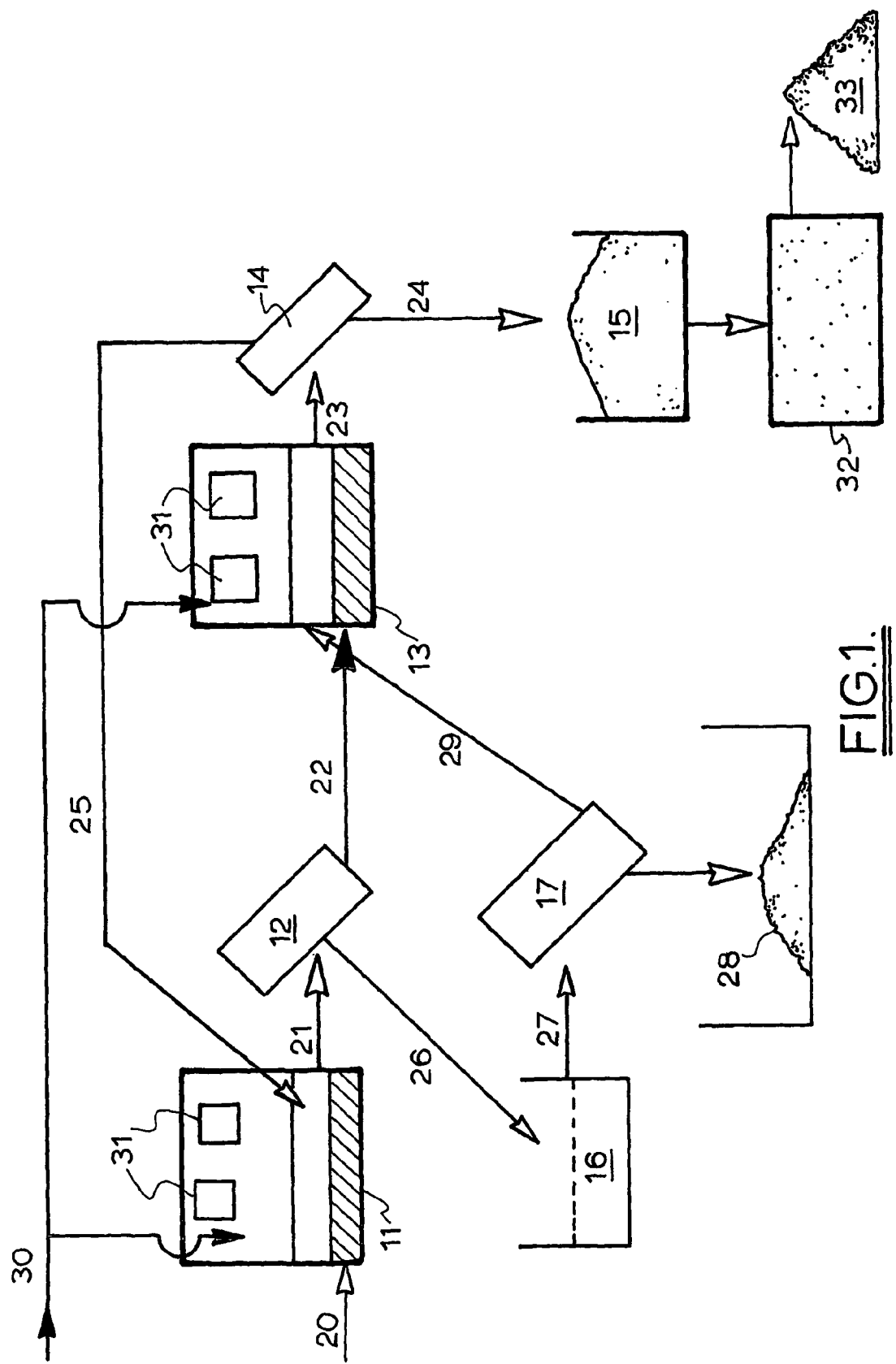
FIG. 1 is an illustration of a plant used in this invention.

A preferred embodiment of the invention is described with reference to the drawing FIG. 1 which is a schematic illustration of the plant and process of this invention. The plant is intended for use in treating both old and new sludges and contaminated soils and some waste streams.

The plant consists of two closed reaction vessels 11 and 13 a heavy metal precipitation tank 16 and centrifugal decanter separators 12, 14 and 17 and a solids blending vessel 15.

Old sludge from a waste treatment deposit and new sludge from a treatment plant are blended and introduced via line 20 into the reaction vessel 11. A sulfuric acid containing solution of pH 1 is introduced via line 25 into the tank. The solution at a solids content of about 25% is agitated for a time of from half an hour to 2 hours. Sequestering agents may be added at this stage to facilitate the separation of heavy metals. The slurry is then passed via line 21 to the centrifuge 12 where the solids are separated and passed via line 22 to the second treatment vessel 13. The treatment conditions in 13 are the same as for vessel 11.

Because the blended sludge generates hydrogen sulfide during the acid treatment, the vessels 11 and 13 are closed during the filling and mixing stage and the ultra violet ozone generators 31, located in the head space of the vessels, are activated to oxidize the hydrogen sulfide to water soluble sulfurous and sulfuric acids. An alternative to providing the ozone generator in the head space is to install an external ozone generator next to the vessels 11 and 13 and pipe the ozone into the head space. This avoids the need to periodically clean the lamps or generators within the head space and also avoids corrosion of the lamps or generators by the acidic environment in the head space of vessels 11 and 13.

Another alternative is to pump off the gas from the head space to a gas scrubber to remove the noxious gases. It is preferred to introduce ozone into the headspace so that the sulfur gases are converted to sulfuric acid and thus enrich the acidity of the recycled treatment liquor.

The liquor separated in the centrifuge 12 is passed via line 26 to the heavy metal holding and precipitation tank 16 where potassium hydroxide is added to adjust the pH of the solution and precipitate the metals as metal salts.

The slurry from the precipitation tank 16 is then passed via line 27 to the centrifugal separator 17 where the metals are extracted as a residue 28 and the liquor is recycled via line 29 to the reaction vessel 13. Fresh sulfuric acid and make up water may be added to line 29 to ensure the acidity of the solution added to reaction vessel 13 is below pH 1. Additional make up water and acid which may be plant waste water is introduced into the treatment vessels 11 and 13 via line 30. The residue 28 may be sold as a zinc matte for recycling or encapsulated for use as construction fill.

The treated slurry exits reaction chamber 13 via line 23 to the centrifugal separator 14. The liquor separated at 14 is passed via line 25 to the first reaction vessel 11.

The decontaminated solids 24 exiting the separator 14 are passed to the neutralization mixer 15 where they are blended with crushed lime stone to achieve a desirable soil pH. This product may be further blended in a blending installation 32, to provide a range of commercially acceptable soil conditioners and fertilizers 33.

From the above description those skilled in the art will realize that the present invention provides an environmentally sound method of treating sewage sludges or contaminated soils without any offensive odours and any liquid effluent stream. In addition these advantages are provided using low cost reagents such as sulfuric acid, potassium hydroxide and crushed limestone that are usually available as industrial waste or by products.

Those skilled in the art will also realize that the present invention can be implemented in a variety of embodiments without departing from the core teachings of the invention.

The invention claimed is:

1. A method of decontaminating heavy metal contaminated soil or sludge which includes
   a) treating soil or sludge with an acid at a pH below 2 in a first treatment stage to form a liquid and a solid phase with a solids content from 5 to 30%
   b) separating the liquid and solid phases from the first treatment stage
   c) mixing the solid phase from the first treatment stage with a fresh acid liquid at a pH below 2 in a second treatment stage to form a liquid and a solid phase with a solids content from 5 to 30%
   d) separating the liquid and solid phases from the second treatment stage
   e) treating the liquid separated in step b) from the first treatment stage to precipitate heavy metals
   f) separating the precipitated heavy metals from the liquid of step e) and recycling the liquid to step c)
   g) treating the solids from step d) to adjust the pH to a level acceptable for a soil conditioner or fertilizer
   h) using the liquid from step d) as the acidic liquid in the first treatment stage for fresh batches of soil or sludge.

2. A method as claimed in claim 1 in which the acid is sulfuric acid.

3. A method as claimed in claim 1 in which the heavy metals are precipitated by adding a base to adjust the pH of the liquid to precipitate the metals as salts.

4. A method as claimed in claim 3 in which the base is potassium hydroxide.

5. A method as claimed in claim 1 in which the solids from step d) are blended with crushed limestone.

6. A method as claimed in claim 1 in which the first and second treatment stages are carried out in closed vessels containing a source of ozone in the head space of the closed vessels.

7. A method of decontaminating contaminated soil or sludge which includes sulfur containing materials which method includes
   a) treating sulphur containing soil or sludge with an acid at a pH below 2 in a closed vessel containing a source of ozone in the head space of the closed vessel to form a liquid and a solid phase with a solids content from 5 to 30%, and convert hydrogen sulfide to sulfurous and sulfuric acid which dissolve in the liquid phase
   b) separating the liquid and solid phases from the closed vessel
   c) treating the liquid separated in step b) to precipitate heavy metals
   d) separating the precipitated metals from the liquid of step c) and recycling the liquid to step a)
   e) treating the solid phase from step b) to adjust the pH to a level acceptable for a soil conditioner or fertilizer.

8. A method as claimed in claim 7 wherein the ozone is externally generated and introduced into the head space.

* * * * *